United States Patent [19]

Plath

[11] Patent Number: 4,738,652
[45] Date of Patent: Apr. 19, 1988

[54] BELT DRIVE, FOR EXAMPLE FOR THREAD-FEEDING DEVICES OF TEXTILE MACHINES

[75] Inventor: Ernst-Dieter Plath, Albstadt, Fed. Rep. of Germany

[73] Assignee: Sipra Patententwicklungs-und Beteiligungsgesellschaft mbH, Albstadt, Fed. Rep. of Germany

[21] Appl. No.: 938,789

[22] Filed: Dec. 5, 1986

[30] Foreign Application Priority Data

Dec. 6, 1985 [DE] Fed. Rep. of Germany ....... 3543183

[51] Int. Cl.[4] .............................................. F16H 55/00
[52] U.S. Cl. .................... 474/158; 242/47.01
[58] Field of Search ................................ 474/158–160, 474/152–153, 166–171, 184, 149; 242/47.01

[56] References Cited

U.S. PATENT DOCUMENTS

| | | | |
|---|---|---|---|
| 1,144,414 | 6/1915 | Holmes | 474/153 X |
| 3,338,107 | 8/1967 | Kiekhaefer | 474/153 |
| 4,015,484 | 4/1977 | Taylor | 474/167 |

FOREIGN PATENT DOCUMENTS

| | | |
|---|---|---|
| 7419793 | 6/1974 | Fed. Rep. of Germany . |
| 2531378 | 1/1976 | Fed. Rep. of Germany . |
| 2365251 | 2/1983 | Fed. Rep. of Germany . |

Primary Examiner—Stephen J. Novosad
Assistant Examiner—Thuy M. Bui
Attorney, Agent, or Firm—Michael J. Striker

[57] ABSTRACT

A belt drive includes a driven shaft and two belt pulleys supported on the shaft for guiding toothed belts. Each belt has a toothed portion and a smooth untoothed portion. Each pulley is a multi-part element and includes a first portion having a toothed crown engageable with the toothed portion and a second portion having a smooth supporting surface for the non-toothed part of the belt. The first and second portions of the pulley are turnable relative to each other. The first portion of the pulley cooperating with the belt is the form-locking manner is rigidly connected to the shaft whereas the second portion for a friction-type connection with the belt is rotationally supported on the shaft and relative to the first portion.

10 Claims, 1 Drawing Sheet

BELT DRIVE, FOR EXAMPLE FOR THREAD-FEEDING DEVICES OF TEXTILE MACHINES

BACKGROUND OF THE INVENTION

The present invention relates to a belt drive device, for example for thread-feeding arrangements of textile machines.

Belt drives of the type under consideration are known and usually include at least one driven endless belt and at least one driven shaft with which a belt pulley is coupled and from which it is uncoupled. The endless belt is guided over this pulley and has, at the same time, with said pulley in one region a form-locking connection and in one region only a friction locking connection.

A belt type of the foregoing type has been disclosed, for example in DE-PS No. 23 65 251 and DE-GM No. 74 19793. These publications disclose the arrangements in which flat drive belts are utilized, which are provided in the middle with a row of holes in which pins of the medium spike-like rim or crown, formed on the belt pulley, are engaged so as to effect a form-locking connection between the belt and the pulley whereas the peripheral edges of the flat belt lie on the smooth edge areas of the belt pulley to form a friction connection therewith. The flat belt provided with a perforated disc has the advantage which resides in that it can be formed of a belt piece by connecting two ends of the belt to each other to form the endless belt as known with the toothed belts, disclosed for example in DE-OS No. 25 31378; however the form-locking drive connection between the belt and the belt pulley which is provided with teeth over the entire width thereof is not possible. The fully toothed drive belts must be manufactured originally as endless belts and precisely adjusted to a desired length.

With the perforated belts mentioned hereinabove, in which a form-locking connection in one region and a friction connection in the other region between the belt and the pulley are provided, often, during the manufacture of such belts, bursting off of the belt from the pulley occurs whereby frequency of this occurrence increases with increased running speeds of the belt and increased area of the belt gripping surface. Study of the belts have shown that this bursting off tends to occur in only a small unavoidable extension of the belt, and the hole distribution or tooth-spacing of the belt due to this extension, no longer coincides with the spacing of corresponding form-locking projections or recesses of the belt pulley. The adjustment of the belt pulley to the movement of the slightly extended or elongated drive belt is, however, not possible because of the simultaneous friction-locking connection of the belt with the pulley.

SUMMARY OF THE INVENTION

It is an object of the present invention to provide an improved belt drive device.

It is a further object of the invention to provide a belt drive, in which a slip-free drive with the endless belt would be ensured, and with which a belt would be made from a straight belt piece by connection of the belt ends to each other, in which bursting off of the belt from the pulley would be avoided at a normally loaded belt.

These and other objects of the invention are attained by a belt drive device, for example for thread-feeding arrangements of textile machines, comprising at least one driven endless belt; at least one driven shaft; at least one pulley which is engageable with said shaft and which guides said belt, said belt being connected to said pulley at one contact part therebetween in a form-locking manner and, at the same time, at another contact part in a friction-locking manner, said pulley having a first portion providing with said belt a friction-type connection, and a second portion providing with said belt a form-locking connection, said first portion and said second portion being turnable relative to each other.

Due to the invention, it is obtained independently from the structure and location of the form-locking connection and only one friction connection on the surface of the belt, that the friction-locking connection of the belt with the pulley can not disturb the form-locking connection of the belt with the pulley. Hereby, the friction-locking connection of the belt with the pulley is either completely disengaged in the action because either one portion of the pulley having a smooth supporting surface for the belt or some portions of the pulley are rotation-freely supported, or their action is reduced because either one portion of the pulley with the smooth supporting surface or the portions of the pulley are rotationally supported with braking. The support of these portions is carried out on the driven shaft with which only one or many regions having recesses and/or projections of the driven-side belt pulley are rotation-fixed connected.

The belt may have on a portion of a width thereof at least projections and recesses which cooperate in a form-locking manner with respective at least recesses and projections formed on said pulley, a portion of said pulley having said at least recesses and projections being rotation-fixed coupled to said driven shaft, whereas at least a portion of said pulley provided with a smooth supporting surface for a smooth surface of said belt being rotation-free and coaxially supported on said shaft.

Two such belts and two such pulleys for guiding said two belts, respectively may be provided, each belt having at a rim thereof a toothing formed by spaced grooves, each pulley having at said second portion a toothed crown engaging said toothing, said portion of each pulley provided with a smooth supporting surface receiving an untoothed part of said belt forming said first portion of said pulley and being turnable relative to the toothed crown of the pulley.

Such a belt drive for many thread-feeding arrangements may comprise a plurality of toothed belts coupled with respective drive shafts, each shaft supporting thereon at least two axially adjustable and rotation-fixed pulleys guiding respective belts, axially adjustable and rotation-fixed clutch means with clutch projections for selectively coupling one of said pulleys with said shaft, each belt having a toothing, said second portion of each pulley having a toothed crown engageable with said toothing, said first portion of each pulley having a smooth supporting surface for supporting an untoothed portion of a respective belt, said first portion being rotatable relative to said first portion of each pulley and relative to said driven shaft, said second portion of each pulley being provided with clutch recesses engageable with said clutch projections of said clutch means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
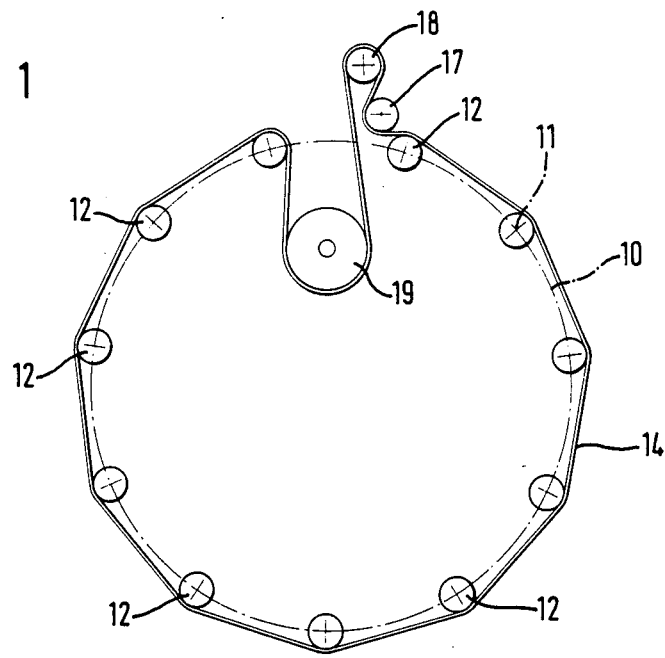
FIG. 1 is a schematic top view of the belt drive device.

FIG. 1 illustrates a belt drive device which is common to eleven thread-feeding devices. Since only the drive of the thread-feeding device is the subject of the present application the thread-feeding device itself, which is conventional, is not shown in detail. Eleven individual thread-feeding devices are arranged on a circle 10, shown by dash-dotted lines, at the same intervals from each other, in the circular knitting machine. Each thread-feeding device has a schematically shown drive shaft 11 with which at least one belt pulley 12 is coupled. In the exemplified embodiment two belt pulleys 12 and 13 are provided per one drive shaft 11, and the belt drive device respectively has two drive belts 14 and 15 of which only belt 14 is shown in FIG. 1. Both drive belts 14 and 15 are provided with grooves 16 uniformly spaced from each other and constituting a toothing of each belt. The ends of each belt are connected to each other to form endless drive belts.

According to FIG. 1 the endless drive belt 14 is guided over belt pulleys 12 of all drive shafts 11. This belt also extends over a stationary deflecting roller 17 and an adjustable belt-clamping roller and is set into motion with a desired drive speed by means of a drive gear 19. The drive gear 19 can be adjusted in its belt-receiving diameter whereby the adjustment of speed is possible. This drive gear 19 can be connected to the drive shaft of the circular knitting machine or to the shaft of a specific motor. The same connection can be made for the second drive belt 15, the drive gear of which can be arranged either on the same drive shaft or the other drive shaft. Both drive belts 14 and 15 lie on the belt pulleys 12 or 13 over a small angle of grip.

Figure 2:
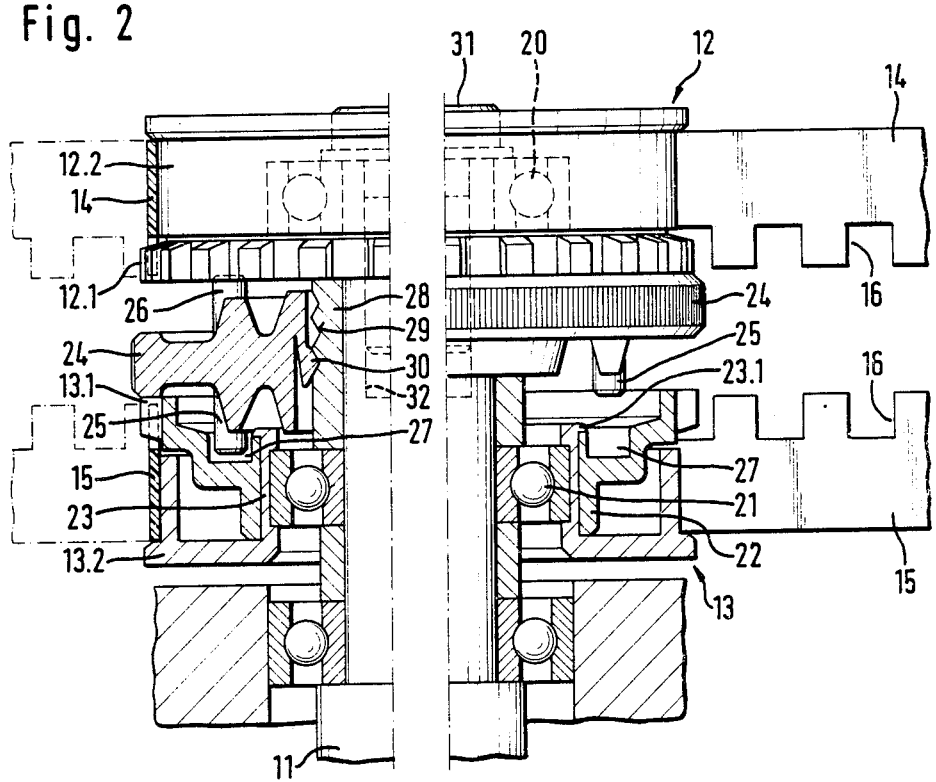
FIG. 2 is a partially sectional side view of the drive of the thread-feeding device with two belt pulleys which are selectively coupled with a drive shaft and two endless drive belts

With reference to FIG. 2 it will be seen that two belt pulleys 12 and 13 are freely-rotatably supported on the drive shaft 11 by ball bearings 20 and 21. The belt pulleys 12 and 13 are formed to be precisely the same, they however are differently situated on the drive shaft 11. These belt pulleys are each subdivided into a toothed crown 12.1, 13.1 and a drum 12.2, 13.2. The toothed crowns 12.1, 13.1 each forms an edge region of the respective belt pulley 12, 13. The toothed crown 12.1 and 13.1 cooperate with toothings 16 of the drive belts 14 and 15. As clearly seen from the axial sectional view of the belt pulley 13 the toothed crown 13.1 with a central bearing ring 22 is arranged as a sleeve bearing on a sleeve-like portion 23 of the drum 13.2. The ball bearing 21 is molded in this sleeve-like portion 23. The toothed crown 13.1 and the drum 13.2 of the belt pulley 13 and, respectively the toothed crown 12.1 and drum 12.2 of belt pulley 12 can be turned relative to each other. By a small flange 23.1 at the edge of the sleeve portion 23 the toothed crown 13.1 is prevented from the axial displacement relative to the drum 13.2. The drum 12.2, 13.2 forms a smooth supporting surface for the untoothed portion of the respective drive belt.

Between the belt pulley 12 and the belt pulley 13, is arranged an axially adjustable clutch disk 24 which is shown in the left-side half of FIG. 2 in section and is non-sectioned in the right-side half of this figure. The clutch disk 24 is provided at both end sides with clutch projections 25 and 26 which are positioned on the same circle and with the same spacing with clutch recesses 27 which are formed in the toothed crowns 12.1 and 13.1. The clutch disk 24 is fixed against rotation with and is concentrically positioned on a clutch support 28 which is suspended on the drive shaft 11. The clutch support 28 has a polygonal, for example hexagonal periphery (non-shown) and is provided at the outer side with three locking notches 29 (shown in the left-side part of FIG. 2), in which resilient locking projections 30 of the clutch disk 24 can be locked. The clutch support 28 is clamped between two ball bearings 20 and 21 by means of a bolt 31 which is anchored in a concentrical threaded bore 32 provided in the free end of the drive shaft 11.

As seen from the left-hand part of FIG. 2 the clutch disk 24 is positioned with its locking projection 30 in the lowermost one of three locking notches 29 of the clutch support 28. In this position, the clutch projections 25 of the clutch disk 24 are engaged in the clutch recesses 27 of the toothed crown 13.1 of the belt pulley 13 and thereby cause the rotation-fixed coupling of the toothed crown 13.1 with the drive shaft 11.

The clutch disk 24, which is shown at the right-hand side of FIG. 2 un-sectioned, is illustrated at that side in its uppermost position, in which its clutch projections 26 are engaged in the respective clutch recesses of the toothed crown 12.2, and the toothed crown 12.1 is rotation-fixed coupled with the drive shaft 11. Drum 12.2 of the pulley 12 remains also freely-rotatable on shaft 11.

In the non-shown intermediate position in which the locking projection 30 is locked in the middle one of three locking notches 29 of the clutch support 28, both toothed crowns 12.1 and 13.1 are uncoupled from each other both belt pulleys 12 and 13 freely rotate their toothed crowns 12.1, 13.1 and the drive shaft 11 remains standstill.

It will be understood that each of the elements described above, or two or more together, may also find a useful application in other types of belt drives differing from the types described above.

While the invention has been illustrated and described as embodied in a belt drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A belt drive device, for example for thread-feeding arrangements of textile machines, comprising at least one driven endless belt; at least one driven shaft; at least one pulley which is engageable with said shaft for driving and guiding said belt, said belt being connected to said pulley at one contact part therebetween in a form-locking manner and, at the same time, at another contact part in a friction-locking manner, said pulley having a first portion (12.2, 13.2) providing with said belt a friction-type connection, and a second portion (12.2, 13.1) providing with said belt a form-locking connection, said first portion and said second portion being turnable relative to each other.

2. The belt drive as defined in claim 1, wherein said belt has on a portion of a width thereof at least projections and recesses which cooperate in a form-locking manner with respective at least recesses and projections formed on said pulley a portion of said pulley having said at least recesses and projections being rotation-fixed coupled to said driven shaft whereas at least a portion of said pulley provided with a smooth supporting surface for a smooth surface of said belt being rotation free and coaxially supported on said shaft.

3. The belt drive device as defined in claim 2, wherein two such belts and two such pulleys for guiding said two belts, respectively are provided, each belt having at a rim thereof a toothing formed by spaced grooves, each pulley having at said second portion a toothed crown (12.1, 13.1) engaging said toothing, said portion of each pulley provided with a smooth supporting surface receiving an untoothed part of said belt forming said first portion (12.2, 13.2) of said pulley and being turnable relative to the toothed crown of the pulley.

4. The belt drive device as defined in claim 3, wherein said first portion of each pulley is freely-rotatable supported on said driven shaft.

5. The belt drive device as defined in claim 3, wherein said first portion of each pulley is rotationally supported on said driven shaft with braking.

6. The belt drive device as defined in claim 1, for thread-feeding arrangements and comprising a plurality of toothed belts coupled with respective drive shafts, each shaft supporting thereon at least two axially adjustable and rotation-fixed pulleys guiding respective belts; axially adjustable and rotation fixed clutch means with clutch projections for selectively coupling one of said pulleys with said shaft, each belt having a toothing (16), said second portion of each pulley having a toothed crown (12.1, 13.1) engageable with said toothing, said first portion of each pulley having a smooth supporting surface for supporting an untoothed portion of a respective belt, said first portion being rotatable relative to said first portion of each pulley and relative to said driven shaft, said second portion of each pulley being provided with clutch recesses engageable with said clutch projections of said clutch means.

7. A belt drive device, for example for thread-feeding arrangements of textile machines, comprising at least one driven endless belt; at least one driven shaft; at least one pulley which is engageable with said shaft and which guides said belt, said belt being connected to said pulley at one contact part therebetween in a form-locking manner and, at the same time, at another contact part in a friction-locking manner, said pulley having a first portion (12.2, 13.2) providing with said belt a friction-type connection, and a second portion (12.1, 13.1) providing with said belt a form-locking connection, said first portion and said second portion being turnable relative to each other, said belt having on a portion of a width thereof at least projections and recesses which cooperate in a form-locking manner with respective at least recesses and projections formed on said pulley, a portion of said pulley having said at least recesses and projections being rotation-fixed coupled to said driven shaft whereas at least a portion of said pulley provided with a smooth supporting surface for a smooth surface of said belt being rotation free and coaxially supported on said shaft, said belt having at a rim thereof a toothing formed by spaced grooves, said pulley having at said second portion a toothed crown engaging said toothing, said portion of said pulley provided with a smooth supporting surface receiving an untoothed part of said belt forming said first portion of said pulley and being turnable relative to the toothed crown of the pulley.

8. The belt drive device as defined in claim 7, wherein said first portion of said pulley is freely-rotatable supported on said driven shaft.

9. The belt drive device as defined in claim 7, wherein said first portion of said pulley is rotationally supported on said driven shaft with braking.

10. A belt drive device, for example for thread-feeding arrangements of textile machines, comprising a plurality of driven endless belts and a plurality of drive shafts coupled with respective belts, each shaft supporting thereon at least two axially adjustable and rotation-fixed pulleys guiding respective belts; each belt being connected to a respective pulley at one contact part therebetween in a form-locking manner and, at the same time, at another contact part in a friction-locking manner, each pulley having a first portion (12.2, 13.2) providing with a respective belt a friction-type connection, and a second portion (12.1, 13.1) providing with the respective belt a form-locking connection, said first portion and said second portion being turnable relative to each other; axially adjustable and rotation fixed clutch means with clutch projections for selectively coupling one of said pulleys with said shaft, each belt having a toothing (16), said second portion of each pulley having a toothed crown engageable with said toothing, said first portion of each pulley having a smooth supporting surface for supporting an untoothed portion of a respective belt, said first portion being rotatable relative to said first portion of each pulley and relative to said driven shaft, said second portion of each pulley being provided with clutch recesses engageable with said clutch projections of said clutch means.

* * * * *

UNITED STATES PATENT AND TRADEMARK OFFICE
CERTIFICATE OF CORRECTION

PATENT NO. : 4,738,652

DATED : April 19, 1988

INVENTOR(S) : Ernst-Dieter Plath

It is certified that error appears in the above-identified patent and that said Letters Patent is hereby corrected as shown below:

Claim 1, column 5, line 11, change "12.2" to --12.1--.

Signed and Sealed this

Eleventh Day of October, 1988

Attest:

DONALD J. QUIGG

Attesting Officer        Commissioner of Patents and Trademarks